US012444878B2

(12) United States Patent
Murdoch et al.

(10) Patent No.: US 12,444,878 B2
(45) Date of Patent: Oct. 14, 2025

(54) METHOD AND APPARATUS FOR CREATING DOWNHOLE ELECTRICAL CONNECTIONS

(71) Applicant: SAUDI ARABIAN OIL COMPANY, Dhahran (SA)

(72) Inventors: Euan Martin Murdoch, Aberdeenshire (GB); Pranay Asthana, Dhahran (SA); Rae Younger, Aberdeenshire (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 322 days.

(21) Appl. No.: 18/321,408

(22) Filed: May 22, 2023

(65) Prior Publication Data

US 2024/0396259 A1 Nov. 28, 2024

(51) Int. Cl.

*E21B 17/00* (2006.01)
*E21B 17/02* (2006.01)
*H01R 13/523* (2006.01)
*H01R 43/02* (2006.01)

(52) U.S. Cl.

CPC ......... *H01R 13/523* (2013.01); *E21B 17/028* (2013.01); *H01R 43/02* (2013.01)

(58) Field of Classification Search

CPC .............................. E21B 17/028; H01R 43/02
See application file for complete search history.

(56) References Cited

U.S. PATENT DOCUMENTS 4,032,214 A 6/1977 McNerney
4,669,792 A 6/1987 Kjeldslad
5,174,765 A 12/1992 Nilliams et al.
5,823,257 A 10/1998 Peyton
6,700,161 B2 3/2004 Hsu et al.
(Continued)

FOREIGN PATENT DOCUMENTS

FR 2826792 B1 9/2007
GB 1117379 A 6/1968

OTHER PUBLICATIONS

International Search Report issued for corresponding international patent application No. PCT/US2024/030387, mailed Aug. 19, 2024 (5 pages).

(Continued)

*Primary Examiner* — Phuong Chi Thi Nguyen
(74) *Attorney, Agent, or Firm* — Osha Bergman Watanabe & Burton LLP

(57) ABSTRACT

An apparatus for downhole electrical connection includes: a heater adapted to convert electric energy to thermal energy to liquefy a piece of electronically conductive material; a first electrical circuitry connected to the heater and a power source; a first assembly in which a first connector is disposed; and a second assembly in which a second connector is disposed. The apparatus is configured to: deploy the first assembly and the second assembly in a tubing in a wellbore; mechanically mate the first connector and the second connector; control the electric energy provided from the first electrical circuitry to the heater; electrically connect the first connector and the second connector by soldering the first connector and the second connector with the piece of electronically conductive material; and electrically disconnect the heater from the first electrical circuitry after the soldering.

20 Claims, 10 Drawing Sheets

(56) References Cited

U.S. PATENT DOCUMENTS

| | | | |
|---|---|---|---|
| 6,776,636 B1 | 8/2004 | Cameron et al. | |
| 7,340,819 B2 | 3/2008 | Guven et al. | |
| 7,644,755 B2 | 1/2010 | Stoesz et al. | |
| 7,866,414 B2 | 1/2011 | Patel | |
| 7,955,105 B2 | 6/2011 | Maeland | |
| 7,959,454 B2 * | 6/2011 | Ramasubramanian | H01R 13/523 439/201 |
| 8,801,448 B2 * | 8/2014 | Purdy | H01R 13/6592 439/322 |
| 8,839,850 B2 | 9/2014 | Algeroy et al. | |
| 9,017,101 B2 * | 4/2015 | Ehret | H01R 9/05 29/874 |
| 9,175,523 B2 | 11/2015 | Daiei et al. | |
| 9,761,962 B2 | 9/2017 | Nicholson | |
| 9,853,394 B2 * | 12/2017 | Hamilton-Gahart | H01R 13/533 |
| 9,876,290 B2 * | 1/2018 | Frank | H01R 11/01 |
| 9,941,622 B1 * | 4/2018 | Campbell | E21B 17/028 |
| 10,315,593 B2 | 6/2019 | Dike | |
| 10,533,381 B2 | 1/2020 | Head et al. | |
| 10,851,606 B2 | 12/2020 | August et al. | |
| 10,934,785 B2 | 3/2021 | Fripp et al. | |
| 2003/0211768 A1 | 11/2003 | Cameron et al. | |
| 2015/0184467 A1 | 7/2015 | Patel et al. | |
| 2020/0032620 A1 | 1/2020 | Steele | |
| 2024/0396259 A1 * | 11/2024 | Murdoch | H01R 43/02 |
| 2025/0005728 A1 * | 1/2025 | Murdoch | G06V 10/764 |

OTHER PUBLICATIONS

Written Opinion issued for corresponding international patent application No. PCT/US2024/030387, mailed Aug. 19, 2024 (8 pages).

* cited by examiner

METHOD AND APPARATUS FOR CREATING DOWNHOLE ELECTRICAL CONNECTIONS

BACKGROUND

In hydrocarbon well operations, a variety of systems operated in the downhole environment may require an electrical connection to be established from the surface of the well. For example, monitoring systems and sensors located downhole can be used to measure wellbore properties when connected to a power source. The establishment of a strong, errorless and efficient electrical connections between the wellhead and such systems are increasingly desired in downhole operations because reliable circuitry and higher output is essential to the efficient drilling and completion of wells. However, a durable electrical connection is challenging due to the harsh downhole environment, well geometries, and contamination of impurities such as debris.

Accordingly, there exists a need for a safe electrical connection for downhole operations. Further, the minimization of complexity and allowance for reliable connection, disconnection and reconnection leads to greater productivity and safety.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an apparatus for downhole electrical connection, including: a heater adapted to convert electric energy to thermal energy to liquefy a piece of electronically conductive material; a first electrical circuitry connected to the heater and a power source; a first assembly in which a first connector is disposed; and a second assembly in which a second connector is disposed. The apparatus is configured to: deploy the first assembly and the second assembly in a tubing in a wellbore; mechanically mate the first connector and the second connector; control the electric energy provided from the first electrical circuitry to the heater; electrically connect the first connector and the second connector by soldering the first connector and the second connector with the piece of electronically conductive material; and electrically disconnect the heater from the first electrical circuitry after the soldering.

In another aspect, embodiments disclosed herein relate to a method for downhole electrical connection, including: deploying a first assembly in a tubing in a wellbore; deploying a second assembly in the tubing in the wellbore; creating a mechanical mating of a first connector disposed on the first assembly and a second connector disposed on the second assembly; generating electric energy over a first electrical circuitry; converting the electric energy to thermal energy at a heater; applying the thermal energy to a piece of electronically conductive material; soldering the first connector and the second connector with the piece of electronically conductive material to generate an electrical connection of the first connector and the second connector; and electrically disconnecting the heater from the first electrical circuitry after the soldering.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "single." Rather, the use of ordinal numbers is to facilitate referring to a multiplicity of elements at the same time. By way of an example, a first element is distinct from a second element in some contexts but may not be distinct in other contexts. Also, the first element may encompass more than one element and succeed (or precede) the second element in an ordering of elements.

Embodiments disclosed herein relate to an apparatus for downhole electrical connection. Specifically, embodiments disclosed herein relate to an apparatus that mechanically mates and safely solders connectors while downhole to create a downhole electrical connection. In other aspects, embodiments disclosed herein relate to a method for downhole electrical connection.

Figure 1A:
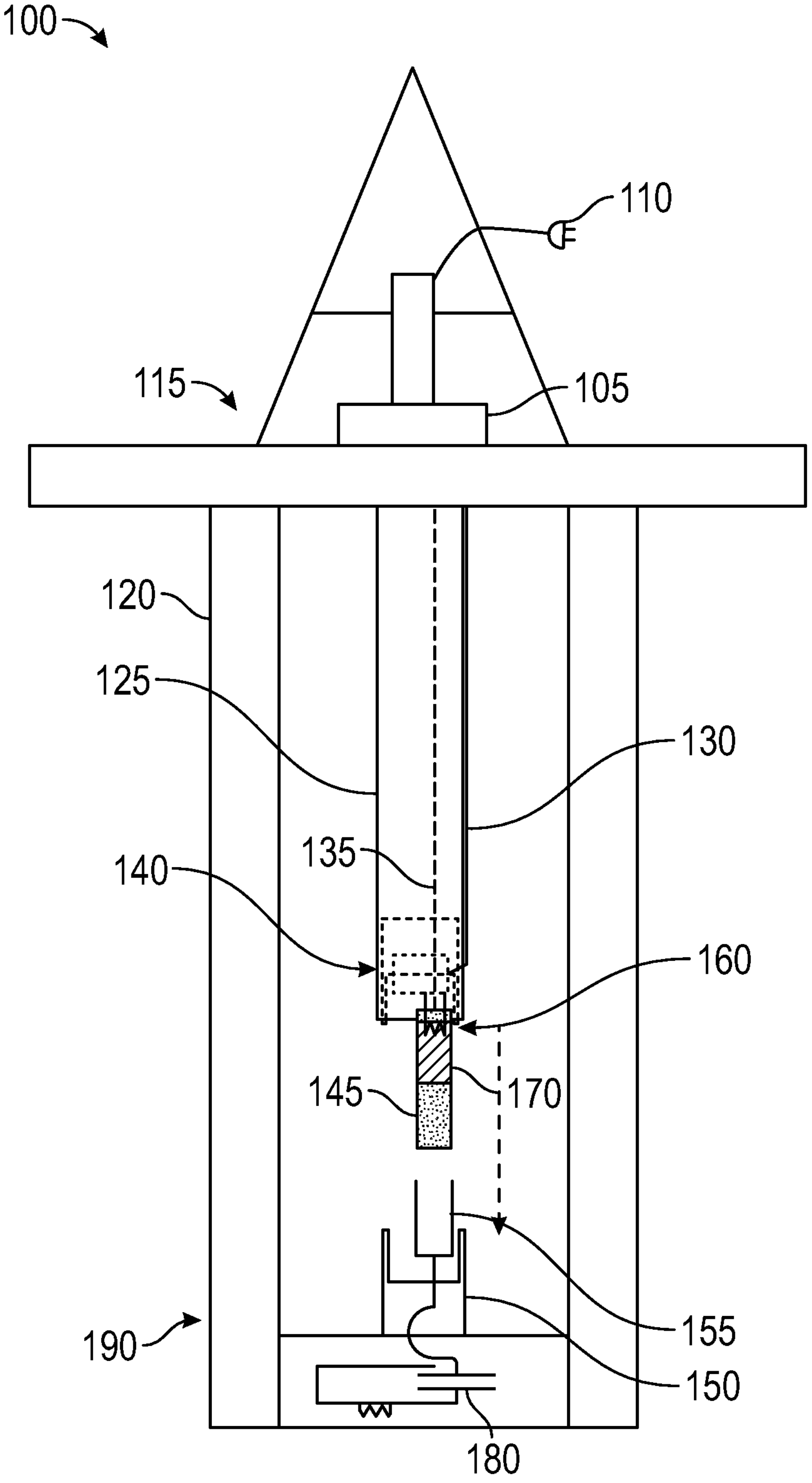
FIGS. 1A, 1B and 1C show schematic views of a system with an apparatus for creating a downhole electrical connection in accordance with one or more embodiments.

FIG. 1A shows schematic view of a system 100 to create a downhole electrical connection in an oil or gas well, in accordance with one or more embodiments. As depicted in FIG. 1A, a downhole electrical connection is required for a variety of reasons in oil and gas well operations. One example is the deployment of sensors and/or monitoring systems which provide wellbore information for intelligent well completions. In another example, power and communications are provided to an electrically submersible pump. The connection mechanism which closes the electrical path from an on-the-surface system to a downhole system requiring connection (e.g., power and/or communications telemetry) may be any connection mechanism known in the art, such as one containing a male connector and a female connector that mate or engage.

In accordance with one or more embodiments, the oil and gas well includes a wellbore 190 drilled into the surface of the Earth. A casing 120 is cemented in place in the wellbore 190. A tubing 125 is disposed within the casing 120. The tubing 125 may be a production string in accordance with one or more embodiments. The well further includes a production tree 115 housing the surface-extending portion of the casing 120 and the surface-extending portion of the tubing 125. The production tree 115 is a series of spools and valves that are used to enable production of fluids from the well and enable downhole access to the well. Herein, the term "production tree 115" may encompass the wellhead and the tubing head without departing from the scope of the disclosure herein.

The system 100 includes a deployment device 105 connected to an apparatus 200. The deployment device 105 is used to raise and lower at least some part of the apparatus 200 inside of the tubing 125. The deployment device 105 may be any type of deployment device known in the art, such as coiled tubing, slickline, or wireline. An input (such as a signal or user input) may direct the deployment device 105 to extend at least some part of the apparatus 200 further into the tubing 125. In one or more embodiments, a cable 130 is strapped (or coupled) to the tubing as it is being run into the hole. This would be done by a drilling or workover rig. The tubing would then come close or latch into an existing tubing previously deployed. The connection would then be made between both tubings and associated cables.

In some embodiments, a downhole system requiring connection 180 is deployed in the casing 120 inside the wellbore 190. To create an electrical connection with the downhole system requiring connection 180, the tubing 125 may be run in the wellbore from the production tree 115. A string containing an electric cable 130 provides a pathway of energy or electrical signal from an electric power supply 110 or other data sources at the production tree 115 through the tubing 125.

In one or more embodiments, the cable 130 is connected to a first electrical circuitry 210. The cable 130 thus provides necessary electrical energy that transforms into thermal energy. The first electrical circuitry 210 may comprise a conductor, a semiconductor, a switch 166 (shown in FIG. 1B), a resister, etc.

In one or more embodiments, the system 100 is adapted to create an electrical connection between a first connector 145 disposed in a first assembly 140 and a second connector 155 disposed in a second assembly 150.

Figure 1B:
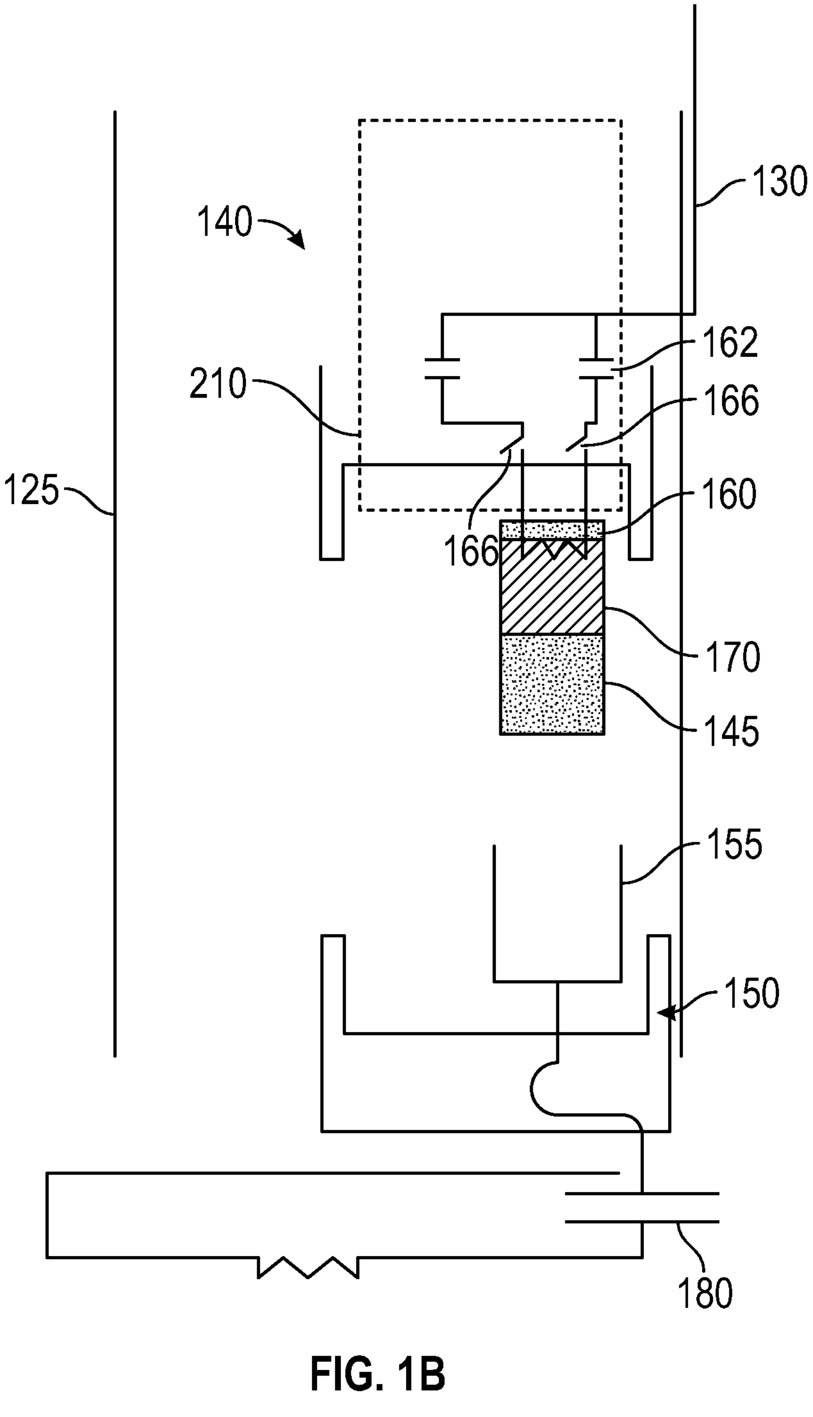

Turning to FIG. 1B, an enlarged view of the apparatus 200 in the tubing 125 inside the wellbore 190. As depicted in FIG. 1B, the first connector 145 and the second connector 155 may be aligned to mechanically mate, when the first connector 145 is moved closer to the second connector 155. In some embodiments, as shown in FIG. 1B, the first connector 145 and the second connector 155 are disposed proximate to the wall of the tubing 125 such that there exists a free space for passing materials and injecting fluids in the tubing 125. More specifically, in one or more embodiments, the first and second connectors are disposed inside the wall section of the tubing 125, and a conduit for production and/or injection is maintained in the wall section.

The first assembly and the second assembly and their relationships to the first connector 145 and the second connector 155 are described in more detail in FIGS. 2A through 4B.

Figure 2A:
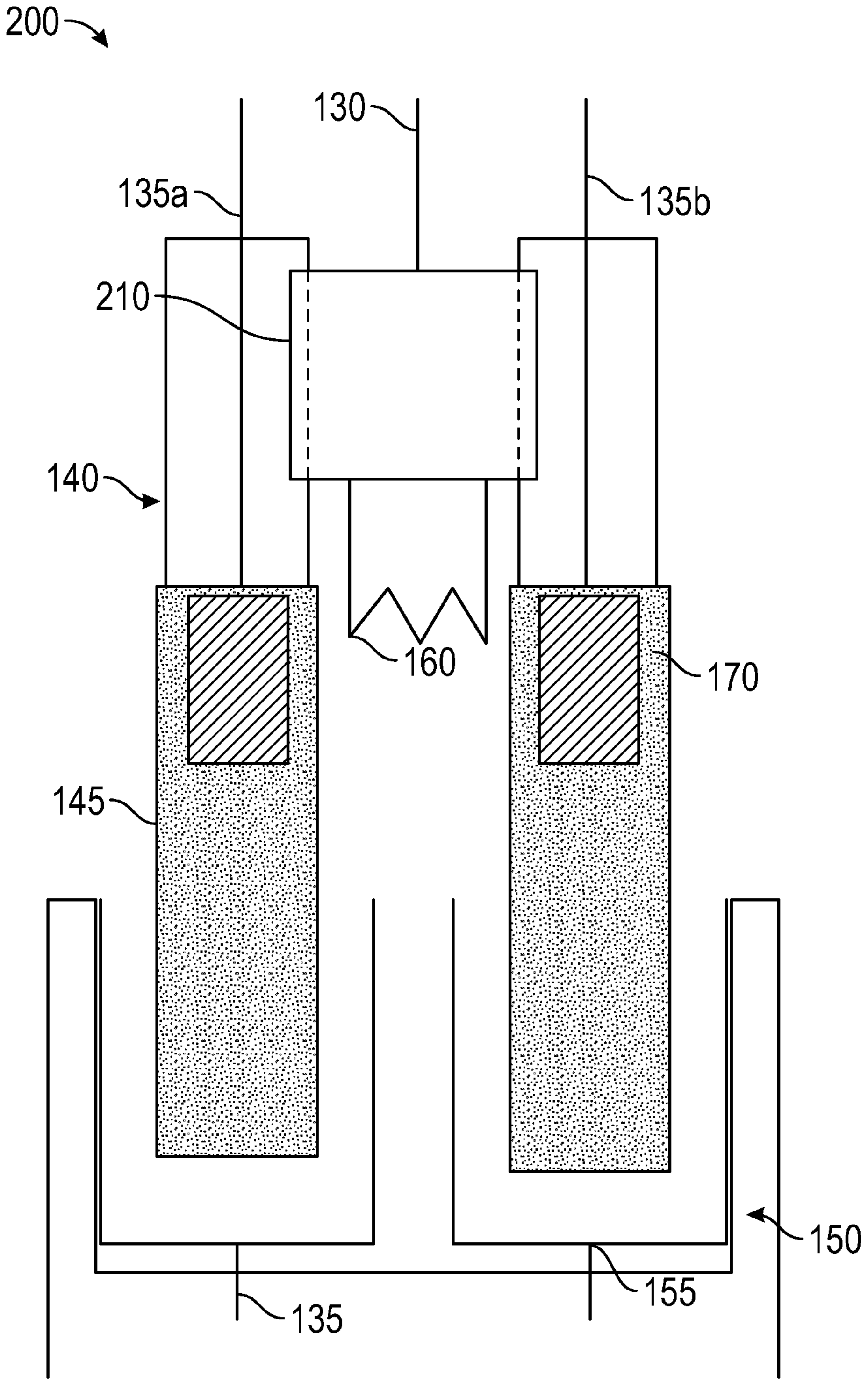
FIGS. 2A, 2B and 2C show schematic views of an apparatus for creating a downhole electrical connection in accordance with one or more embodiments.
Figure 2B:
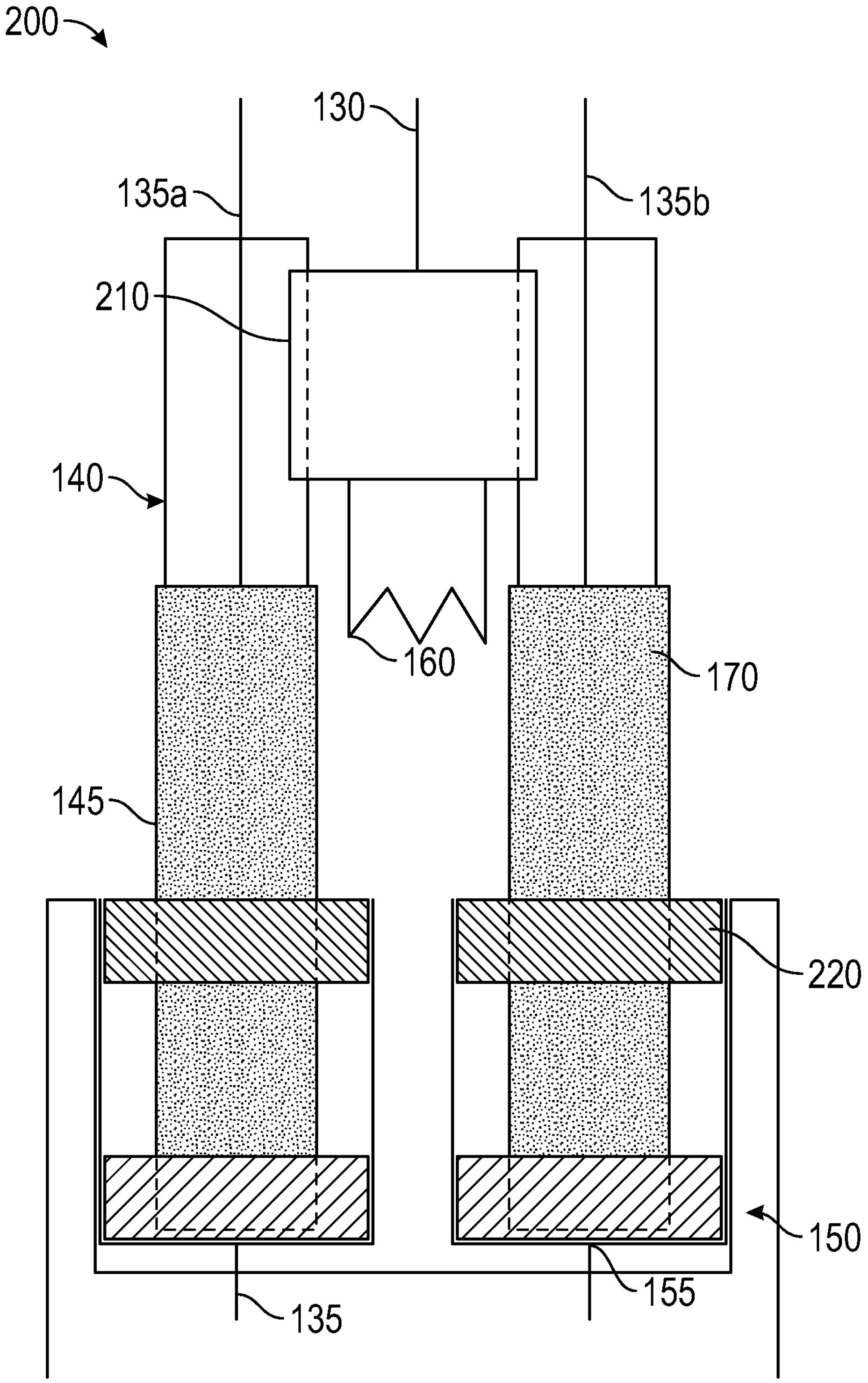

Turning to FIGS. 2A and 2B, FIGS. 2A and 2B show schematic views of an apparatus 200 for creating a downhole electrical connection in accordance with one or more embodiments. Referring to FIG. 2A, the apparatus 200 may include the first assembly 140 in which the first connector 145 is disposed, the second assembly in which the second connector 155 is disposed, the heater 160 adapted to convert electric energy to thermal energy, and the first electrical circuitry 210. In some embodiments, the apparatus 200 may also include the first connector 145 and the second connector 155 in one or more representative configurations. In further embodiments, the first electrical circuitry 210 of the apparatus 200 may include a plurality of conductors.

In one implementation, the first connector 145 is a male connector pre-installed into the first assembly 140, and the second connector 155 is a female connector disposed in the second assembly 150. In this case, the second assembly 150 may be connected to the downhole system requiring connection 180. Those skilled in the art will appreciate that the male/female mating may be reversed, where the first connector is a female connector and the second connector is a male connector, without departing from the scope disclosed herein.

In further embodiments, the apparatus 200 may include a bridge or a plate (not shown) that may be used to convey thermal energy from the heater 160 to another object. The bridge or the plate may be interposed between the heater 160 and the electrically conductive material 170 to prevent the loss of the thermal energy, caused by the spatial distance between the heater 160 and the electrically conductive material. By incorporating the bridge or the plate, the system 100 maintains a safety margin between conductive materials (for instance, the first electrical circuitry 210 or the heater 160 and the borehole environment) to prevent an unintended short circuit or a fire.

In one or more embodiments, the electrically conductive material 170 is one or more materials selected from any of the categories of metals, metal alloys, or native or engineered non-metallics or composites. The electrically conductive material 170 may be magnetic or non-magnetic. The form of the electrically conductive material 170 may be solid, liquid, granular, or any combination therein. The electrically conductive material 170 may also be in the form of a soft pliable matrix or gel. Some examples of the electrically conductive material 170 are liquid metals, such as those made of gallium (Ga), indium (In), and their alloys, granular metals or metallic alloys, nanoparticle modified organic formulations, conductive plastic based composites, polymeric formulations with conductive additives, and different forms of graphene or graphene based materials.

The first assembly 140 includes a wiring 135 that connects the first assembly 140 to the deployment device 105, a circuitry, a device, and/or an interface. The first assembly 140 may also have a housing for the first connector 145, a housing for the electrically conductive material 170, and the electrically conductive material 170. Similarly, the second assembly 150 may include a wiring 135 that connects the second assembly 150 to the downhole system requiring connection 180, a circuitry, a device, and/or an interface. The second assembly 150 may further include a housing for the second connector 155. Although not shown, any suitable electrical connection or mechanical arrangement between the wiring 135*a* and the wiring 135*b* that are compatible may be employed in embodiments disclosed herein.

As with the first assembly 140, the first electrical circuitry 210 includes an electric conduit that provides electrical energy to the heater 160 in accordance with one or more embodiments. Therefore, to avoid an electric hazard, a protective measure may be implemented to keep the first assembly 140 and the first electrical circuitry 210 isolated from environmental fluids in the wellbore. In one or more embodiments, the mechanical mating of the first connector 145 and the second connector 155 is protected by a mechanical or a chemical protective barrier (not shown). A mechanical protective barrier may be any known in the art, such as a retractable sleeve.

One exemplary mechanical mating is illustrated in FIG. 2A. When the apparatus 200 moves the first connector 145 downhole to the proximity of the second connector 155 that is pre-installed in the second assembly 150, a mechanical mating may be formed as shown in FIG. 2A. In some implementations, the downhole movement of the first connector 145 may be controlled by a mechanical mechanism such that it allows some degree of free float (lateral travel). Optionally, if the first connector 145 is disposed in a housing of the first assembly 140, the housing may control the precise location of the first connector 145, including the orientation of the first connector 145. Still at FIG. 2A, the closeness of the first connector 145 to the second connector 155 is one factor for the successful mechanical mating of the two connectors. In some embodiments, the first connector 145 physically touches the second connector 155, and no space exists between the two connectors. In further embodiments, the first connector 145 may be anchored to the second connector 155. For example, the first connector's 145 shape is complementary to the second connector's 155 shape. In other cases, the first connector 145 may have a tighter attachment to the second connector 155 due to a threaded opening that fits a matching opening of the second connector 155. If required to maintain a pressure barrier above or below the first assembly 140 or the second assembly 150, a person of ordinary skill may employ a mating connector such as a bulkhead connector to achieve a desired type of mechanical mating.

In yet another embodiment, the first connector 145 is positioned a few millimeters apart from the second connector 155. In such an embodiment, the mechanical mating of the first connector 145 and the second connector 155 is considered to have formed in a broader sense because the electrical connection of the connectors may be formed by bridging slightly distanced connectors with soldering.

In some embodiments, there are a few millimeters of distance between the first connector 145 and the second connector 155. Over the distance between the first connector 145 and the second connector 155, an electrical connection of the first connector 145 and the second connector 155 is formed by placing the electrically conductive material 170, in accordance with one or more embodiments. In other embodiments, there may be shorter or wider distances between the first connector 145 and the second connector 155 to realize the electrical connection. In other words, larger gaps may be bridged by the solder forming the electrical connection.

In an exemplary implementation of the apparatus 200, the mechanical mating of the first connector 145 and the second connector 155 prevents interruption of generation of the electrical connection by the environmental substance. In further embodiments, the mechanical mating of the first connector 145 and the second connector 155 prevents a flaw in the generation of the electrical connection.

Optionally, the mechanical mating of the first connector 145 and the second connector 155 may be reversed by moving the first assembly 140 or the second assembly 150, or both.

As shown in FIG. 2A, the electrically conductive material 170 may be advanced downhole together with the first connector 145 by the wiring 135. For example, the electrically conductive material 170 may be housed in the first assembly 140 such that the housing of the first connector 145 may also control the positioning of the electrically conductive material 170.

In some embodiments, the electrically conductive material 170 is disposed at a short distance from the heater 160 and the thermal energy emitted from the heater 160 is easily absorbable by the electrically conductive material 170. Alternatively, the bridge or the plate may be incorporated in the apparatus 200 that enhances conveyance of thermal energy from the heater 160 to the electrically conductive material 170. With the bridge or the plate interposed between the heater 160 and the electrically conductive material 170, the apparatus 200 may keep distance between the heater and the electrically conductive material 170.

Keeping with FIG. 2A, the first electrical circuitry 210 is adapted to convey electrical energy from the cable 130 and provide the electrical energy to the heater 160. In some examples, the first electrical circuitry 210 may include more than one conductors, one heater 160, and a switch 166 (shown in FIG. 1B). In such embodiments, electrical power is passed between two conductors via the heater 160. In one or more embodiments, the heater takes power from both conductors and then disconnects from the conductors. This is managed by the first electrical circuitry 210 and could take a number of forms.

Figure 1C:
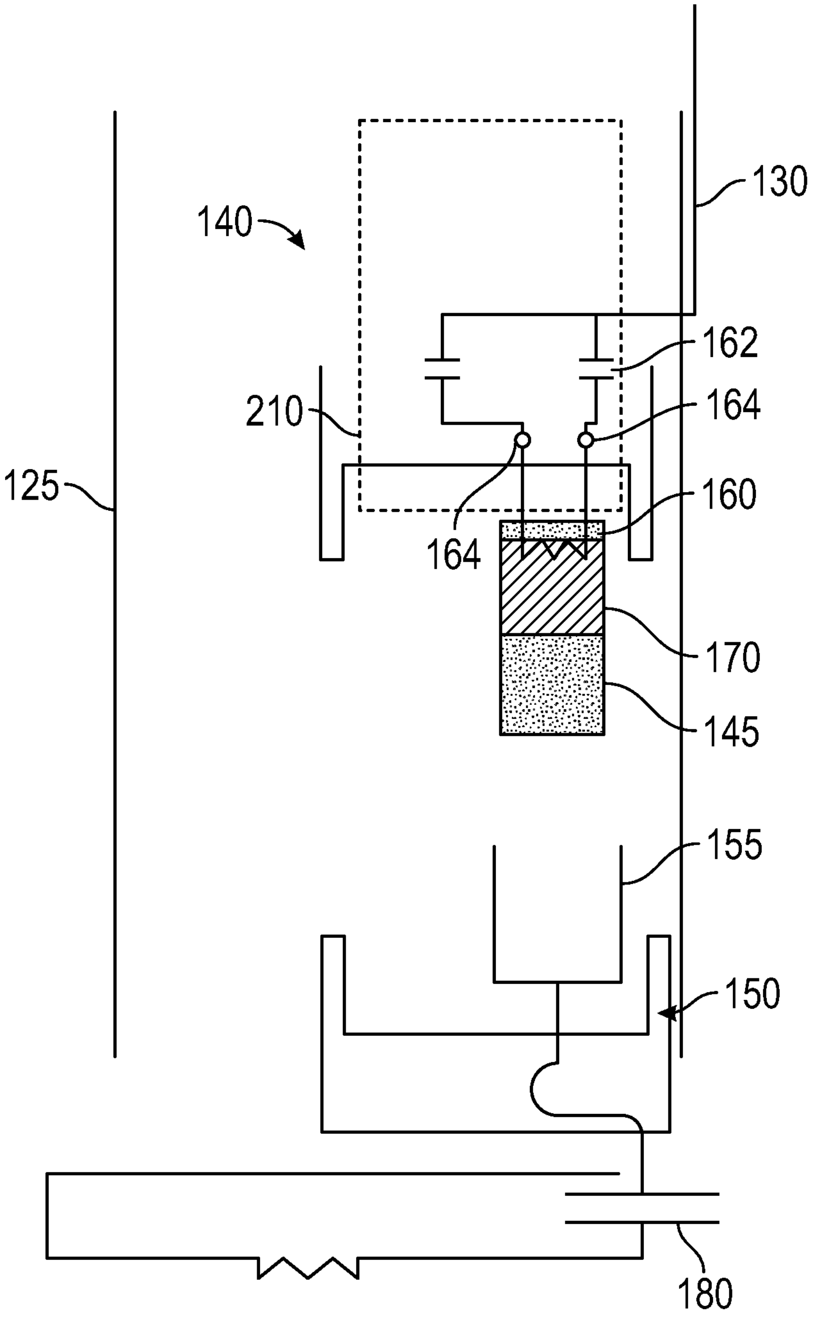

For example, one option is the use of a fusible link such as a fuse 164, as shown in FIG. 1C. The fusible link allows enough electrical power to be supplied to the heater 160. In the event more power is applied, the fusible link breaks and then the conductors are electrically separated. As another option, commands to the pair of conductors and/or a switch 166 whether to include or exclude the heater 160 in connection with the first electrical circuitry 210 may be provided. As shown in FIG. 1B, after making a solder connection, the switch 166 disconnects the heater 160 in some embodiments.

In other examples, only one conductor may be included in the first electrical circuitry 210. Optionally, one heater 160 may heat two pieces of electrically conductive material 170 simultaneously.

When heated to a melting point, the electrically conductive material 170 becomes a liquid. The thermal energy to sufficiently liquefy a mass of metal is calculable if one knows variables such as the type of metal and the weight. Since the electrical energy necessary to create a certain amount of thermal energy is determinable by the joule heating effect, the apparatus 200 may be configured to generate the determined amount of thermal energy from the heater 160 in accordance with one or more embodiments. By supplying the determined amount of electrical energy from the power supply 110 to the heater 160 and melting the electrically conductive material 170, the apparatus 200 creates an electrical connection of the first connector 145 and the second connector 155.

FIG. 2B shows the apparatus 200 after the creation of the electrical connection the first connector 145 and the second connector 155, in accordance with one or more embodiments disclosed herein.

When the electrically conductive material 170 is heated to a melting point, the electrically conductive material 170 is able to flow in the direction of gravity, or via surface tension or into a channel, when such a channel exists. A chemical coating, such as a flux could be used to allow the solder to take a preferential path. In some embodiments, the electrically conductive material 170 flows in the direction of gravity and accumulates in the second connector 155. As exemplary implementations of such embodiments, the second connector 155 may be placed below the electrically conductive material 170 to receive the electrically conductive material 170. Further, the second connector 155 may take the shape of a cylinder, a box, a bowl, or a reversed cone to accommodate the flow of the electrically conductive material 170.

In some embodiments, the electrically conductive material 170 flows into a channel formed by a depression on a surface of the first connector 145 that embraces the electrically conductive material 170, for example.

As such, the electrically conductive material 170 is led to move toward the second connector 155. The liquification of the piece of electronically conductive material 170 causes the piece of electronically conductive material 170 to separate from the first assembly 140 and flow into the second connector 155. The electrical connection of the first connector 145 and the second connector 155 happens when the electrically conductive material 170 accumulates into the space where the first connector 145 and the second connector 155 are mechanically mated.

In one or more embodiments, the electrical connection is protected by a chemical protective barrier. A chemical protective barrier may be any known in the art, such as a self-passivating material like niobium. In this case, niobium, or a similar chemical, would create a thin protection layer when exposed to a water based environmental fluid. In other embodiments, a nonconductive material 220 forms a protective layer. This protective layer may be pierced by the connector.

As shown in FIG. 2B, the apparatus 200 may be configured to dispose a nonconductive material 220 in the space between an outer surface of the electrical connection and the first electrical circuitry 210 and contain the soldering of the first connector 145 and the second connector 155 in isolation from the first electrical circuitry 210 and an environmental substance in the wellbore, including environmental contaminants.

In one or more embodiments, the electrically nonconductive material 220 is one or more materials selected from any of the categories of metals, porcelain, or native or engineered non-metallics or composites. The nonconductive material 220 may be frangible or non-frangible. The form of the nonconductive material 220 may be solid, liquid, granular, or any combination therein. The nonconductive material 220 may also be in the form of a soft pliable matrix or gel.

In further embodiments, the apparatus 200 may be configured to resolve the electrical connection between the first electrical circuitry 210 and the heater 160 after the heating and liquification of the piece of electronically conductive material 170. A disconnection may be achieved by a switch 166 (shown in FIG. 1B) or by a controller of the first electrical circuitry 210. In other embodiments, the housing of the heater 160 may automatically deform when the generation of heat at the heater 160 exceeds a threshold value.

In one or more embodiments, supplying above-limit electrical power through the first electrical circuitry or providing an electrical command to the first electrical circuitry disconnects the heater from a reversibly-connected conductor.

Figure 2C:
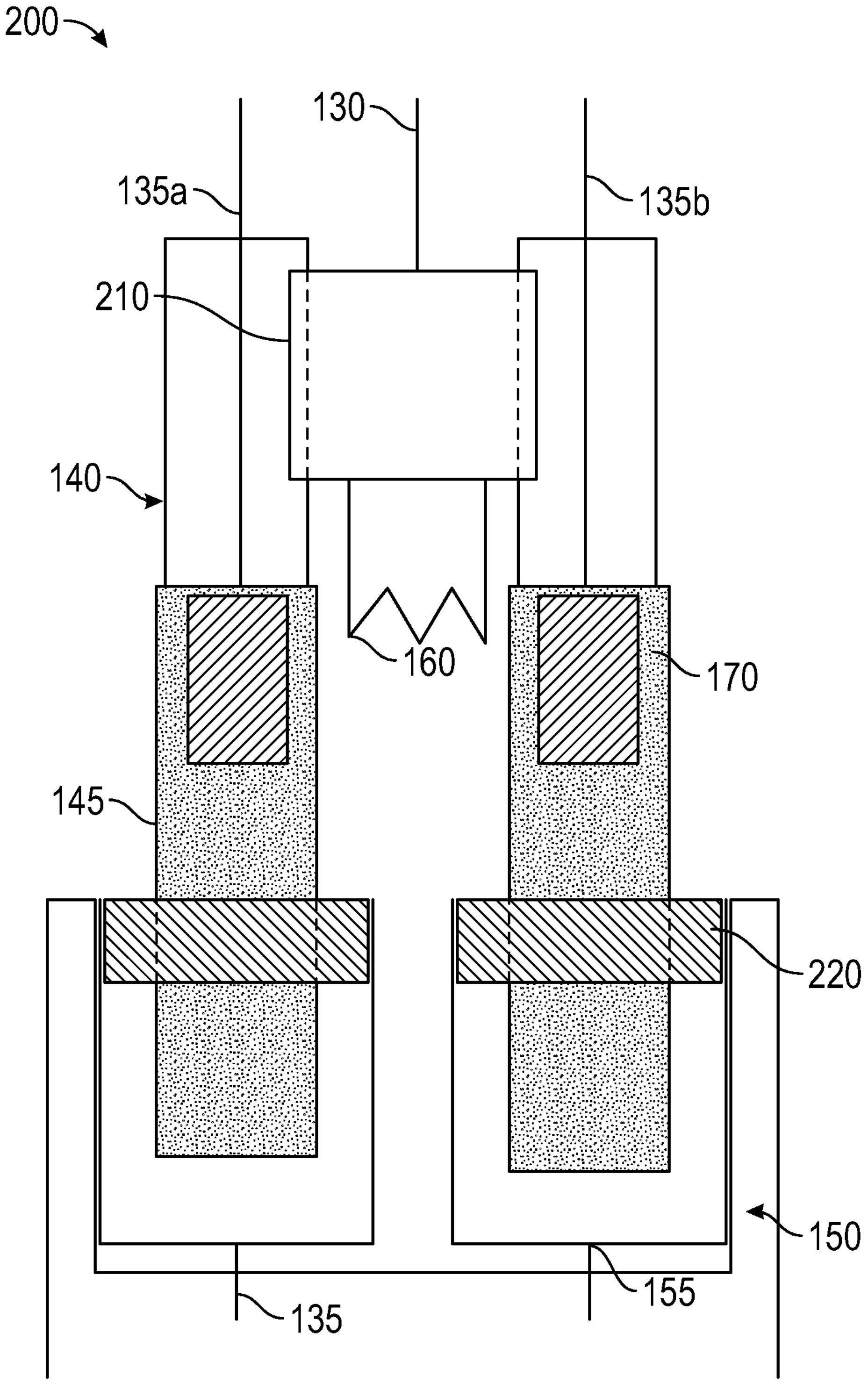

Turning to FIG. 2C, FIG. 2C shows an alternative embodiment to the example shown in FIG. 2A. In the example of the FIG. 2A, the nonconductive material 220 is absent in the space between an outer surface of the electrical connection of the first connector 145 and the second connector 155 and the first electrical circuitry 210 before the creation of the electrical connection. In contrast, the apparatus 200 may be configured to dispose a nonconductive material 220 in the space between a contemplated outer surface of the electrical connection and the first electrical circuitry 210 before the liquification of the electrically conductive material 170.

In such implementations, the first connector 145 and the first assembly 140 may run through the nonconductive material 220, as shown in FIG. 2C. The liquefied electrically conductive material 170 may flow through a hole in the nonconductive material 220, which may exist as a gap between the nonconductive material 220 and the first connector 145. For example, the first connector 145 may have a depressed surface that allows passage of a liquid substance. In the alternative, the temperature of liquified electrically conductive material 170 may cause a break in the nonconductive material 220. Alternatively, as described above, the non-conductive material forms a protective layer that is pierced by the connector. However, the nature of the non-conductive material ensures that the non-conducting barrier is maintained to the outside world. The liquefied electrically conductive material 170 may pass through the nonconductive material 220 to reach a receptacle, a part of the second connector 155 in accordance with one or more embodiments. In other embodiments, the liquified electrically conductive material 220 may be contained within the first connector 145 and then be allowed to flow out of the end of the first connector 145 and between the first connector 145 and the second connector 155.

Figure 3A:
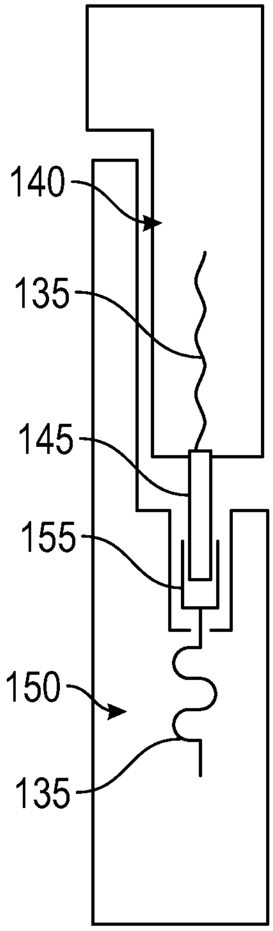
FIGS. 3A to 3C show schematic views of an apparatus for creating a downhole electrical connection in accordance with one or more embodiments.
Figure 3B:
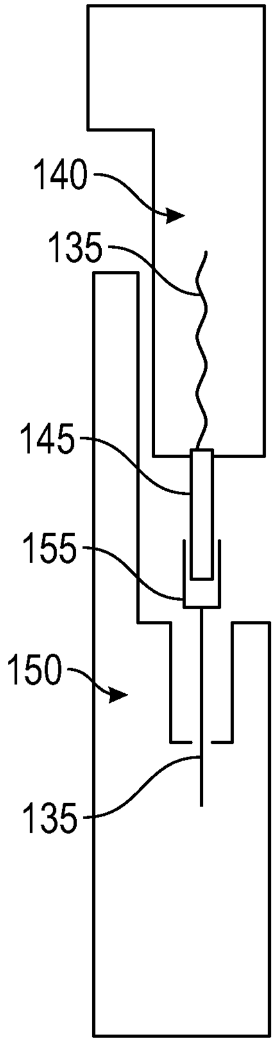
Figure 3C:
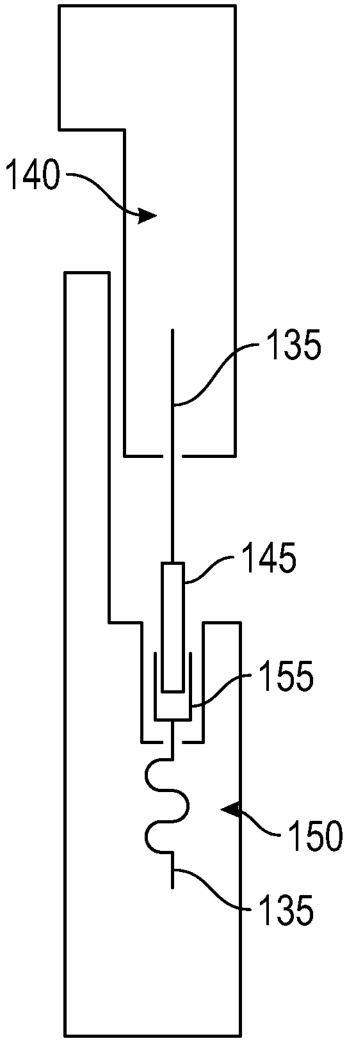

Turning to FIGS. 3A to 3C, schematic views of an apparatus for creating a downhole electrical connection in accordance with one or more embodiments are shown.

In some embodiments, the first assembly 140 may include the wiring 135 connected to the first connector 145, and the second assembly may include the wiring 135 connected to the second connector 155. When the apparatus 200 creates an electrical connection of the first connector 145 and the second connector 155, an electrical path is formed from the wiring 135 in the first assembly 140 to the wiring 135 in the second assembly 150 via the electrical connection, as shown in FIG. 3A. The apparatus 200 may detect the formation of the electrical connection by any suitable method, including measurements made at the surface such as detection of a change in electrical characteristics of the wiring 135. After the soldering of the first connector 145 and the second connector 155 is completed, the apparatus 200 may release the load of the first connector 145 from the first assembly 140 and move the first assembly 140 away from the site of the electrical connection.

As is clear from FIG. 3B, in one or more embodiments, the electrical connection is not broken even when the first assembly 140 is moved to a certain degree (i.e., pulled down, for example). At this point, the first assembly 140 and the second assembly 150 may be moved sideways without affecting the electrical connection as well. The second assembly 150 may release the second connector 155 as shown in FIG. 3B. The wiring 135 may also be released from the second assembly 150. Alternatively, if the second connector 155 is disposed in the second assembly 150 via a housing, the housing may release the second connector 155 so that the second connector 155 is allowed to float to a limited degree (i.e. it allows for additional float of the mated connectors).

Further, the first assembly 140 may release the first connector 145 as shown in FIG. 3C. In other embodiments, if the first connector 145 is disposed in the first assembly 140 via a housing, the housing may release the first connector 145 and optionally, the wiring 135 so that the first connector 145 will be allowed to float to a limited degree.

Accordingly, either the first assembly 140 or the second assembly 150, or both, may be relocated without affecting the electrical connection after solidification of the liquefied piece of electronically conductive material 170.

Figure 4A:
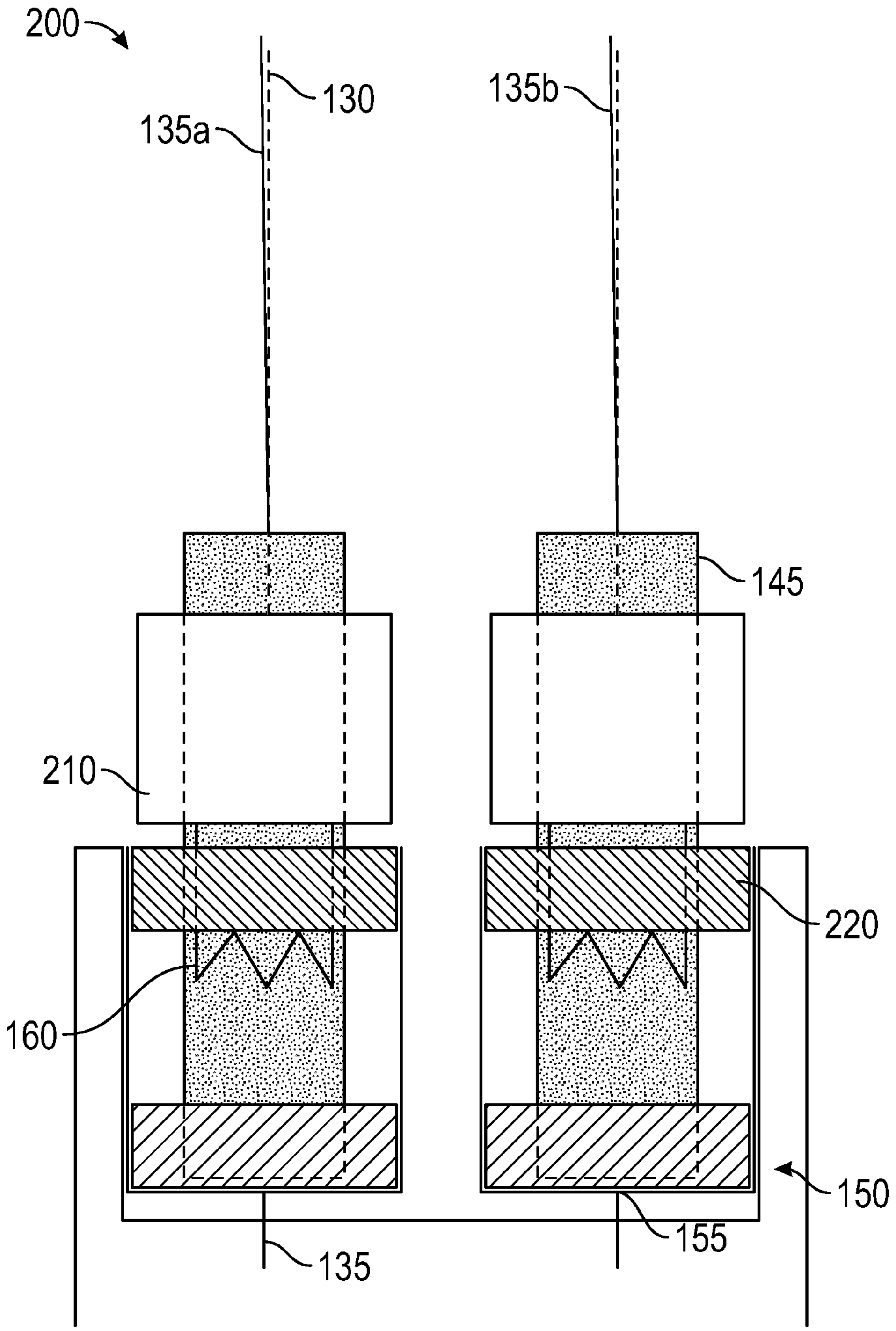
FIGS. 4A and 4B show schematic views of an apparatus for creating a downhole electrical connection in accordance with one or more embodiments.
Figure 4B:
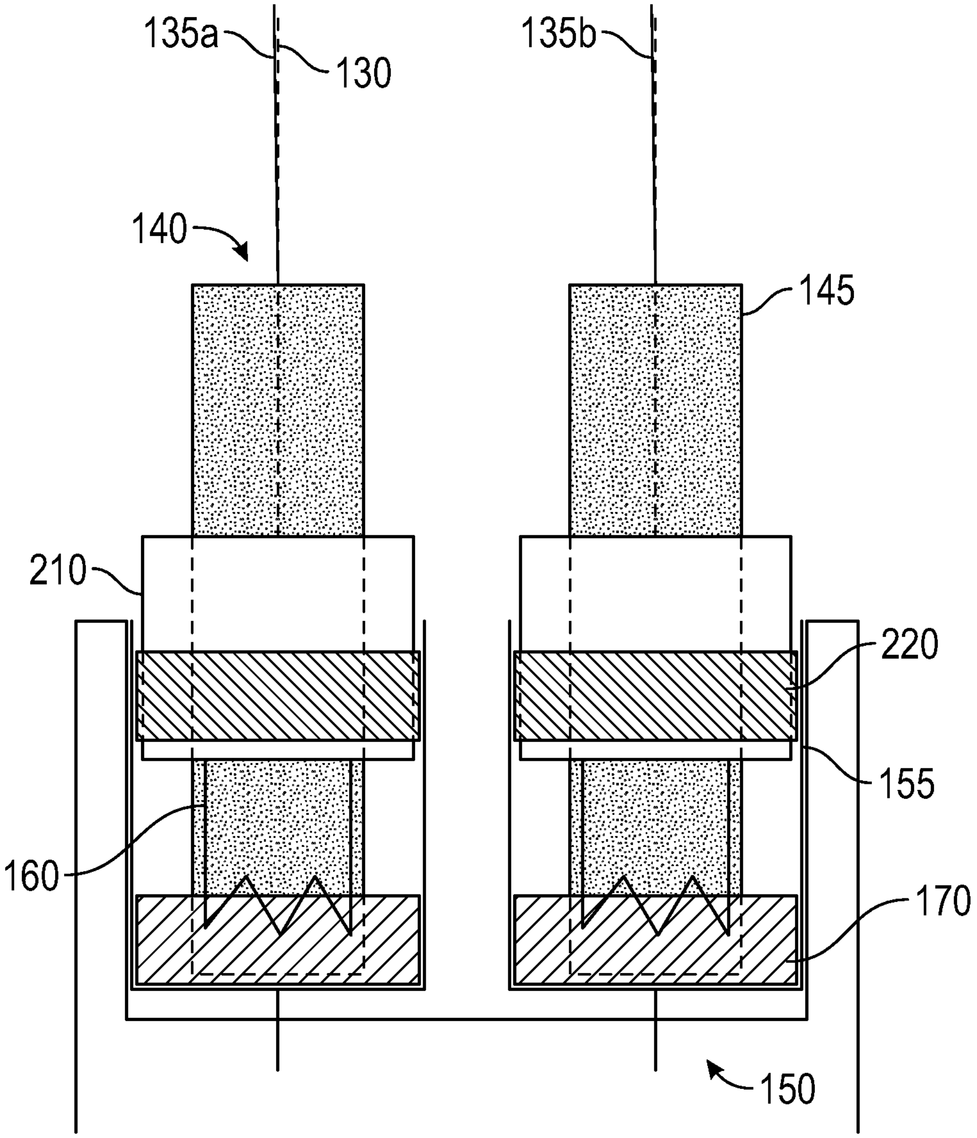

FIGS. 4A and 4B show the reheating and reversal of the electrical connection of the first connector 145 and the second connector 155. FIGS. 4A and 4B do not show contours of the first assembly 140 although any suitable form of the first assembly 140 and the second assembly 150 may be disposed in or around the depicted elements. The first assembly 140 and the second assembly 150 may take a suitable configuration as applicable. Similarly, any suitable electrical connection or arrangement between the wiring 135*a* and the wiring 135*b* may be configurable.

As shown in FIG. 4A, the apparatus may be configured to resolve the electrical connection between the first connector 145 and the second connector by breaking the nonconductive material 220 to provide heat to the electrical connection in accordance with one or more embodiments.

In some embodiments, for passing the heater 160 through the nonconductive material 220, kinetic energy may be given to the apparatus 200 or a housing of the heater 160, and the heater 160 may be slightly pushed downhole. If the nonconductive material 220 is made of liquid or a frangible material, piercing of the nonconductive material 220 may not require a significant level of energy.

In other embodiments, the apparatus 200 may provide electric energy for heat generation. For example, energy may be supplied through the first electrical circuitry 210 to enable the heater 160 to generate thermal energy sufficient to create a path in the nonconductive material 220.

In yet other embodiments, the apparatus 200 may incorporate a stabbing tool in the first assembly 140 to create a path in the nonconductive material 220.

The foregoing modalities for creation of a passage for the heater 160 may be used in combination.

FIG. 4B shows an example of how reheating of the electrical connection is achieved by the heater 160.

In some embodiments, the heater 160 may come into direct contact with the solidified electrically conductive material 170 as shown in FIG. 4B. In other embodiments, the heater 160 is brought proximate to the electrical connection without physical contact. The first electrical circuitry 210 may be located outside the second connector 155 (not shown). Or, the first electrical circuitry 210 may be placed in the nonconductive material 220 as shown in FIG. 4B. Such configuration is permissible if there is a safety measure such as a nonconductive spacer between conductive elements.

In further embodiments, the apparatus 200 may comprise a bridge or a plate that may be used to convey thermal energy from the heater 160 to the solidified electrically conductive material 170. The bridge or the plate may be interposed between the heater 160 to the electrically conductive material 170 to prevent the loss of the thermal energy, caused by the spatial distance between these two. By incorporating the bridge or the plate, the system 100 maintains a safety margin between conductive materials (for instance, the first electrical circuitry 210 or the heater 160 and the second connector and the second assembly) to prevent an unintended short circuit or a fire.

As one option, if the heater 160 is disposed in a housing of the apparatus 200, the housing may control the precise location of the heater 160 in relation to the second connector 155 and the electrically conductive material 170.

Keeping with FIG. 4B, the first electrical circuitry 210 is adapted to convey electrical energy from the cable 130 and provide the electrical energy to the heater 160. In some examples, the first electrical circuitry 210 may include more than one conductors, one heater 160 and a switch 166. In cases where more than one conductor is used, cable 130 may be a multi-cored cable to provide energy to more than one conductor.

When reheated to a melting point, the electrically conductive material 170 becomes a liquid. The thermal energy to sufficiently liquefy the electrically conductive material 170 is calculable by the aforementioned method, the apparatus 200 may be configured to generate the determined amount of thermal energy from the heater 160 in accordance with one or more embodiments. By supplying the determined amount of electrical energy from the power supply 110 to the heater 160 and melting the electrically conductive material 170, the apparatus 200 liquefies the electrically conductive material 170.

After the liquification of the electrically conductive material 170, the electrical connection becomes removable. For example, the first connector 145 may be pulled away from the second connector 155. When there is a gap not bridged by the electrically conductive material 170 between the first connector 145 and the second connector 155, the electrical connection is broken.

In one implementation, the electrically conductive material 170 is able to be removed from the second connector 155 by a vacuum. In another implementation, the electrically conductive material 170 may be captured by a scooper and lifted away from the second connector 155. A per ordinary skill in the art may employ available techniques for the resolution of the electrical connection.

In one or more embodiments, once the first connector 145 is released from the electrically conductive material 170 and disconnected from the second connector 155, the electrically conductive material 170 may be left in the second connector 155 for further use.

In one or more embodiments, the nonconductive material 220 could reform itself into an insulating barrier again by repairing a break that was made to the electrical insulation provided by the nonconductive material 220. For example, the nonconductive material 220 may reacquire fluidity and refill a hole after receiving thermal energy, via a chemical reaction, or using any other suitable method.

Figure 5:
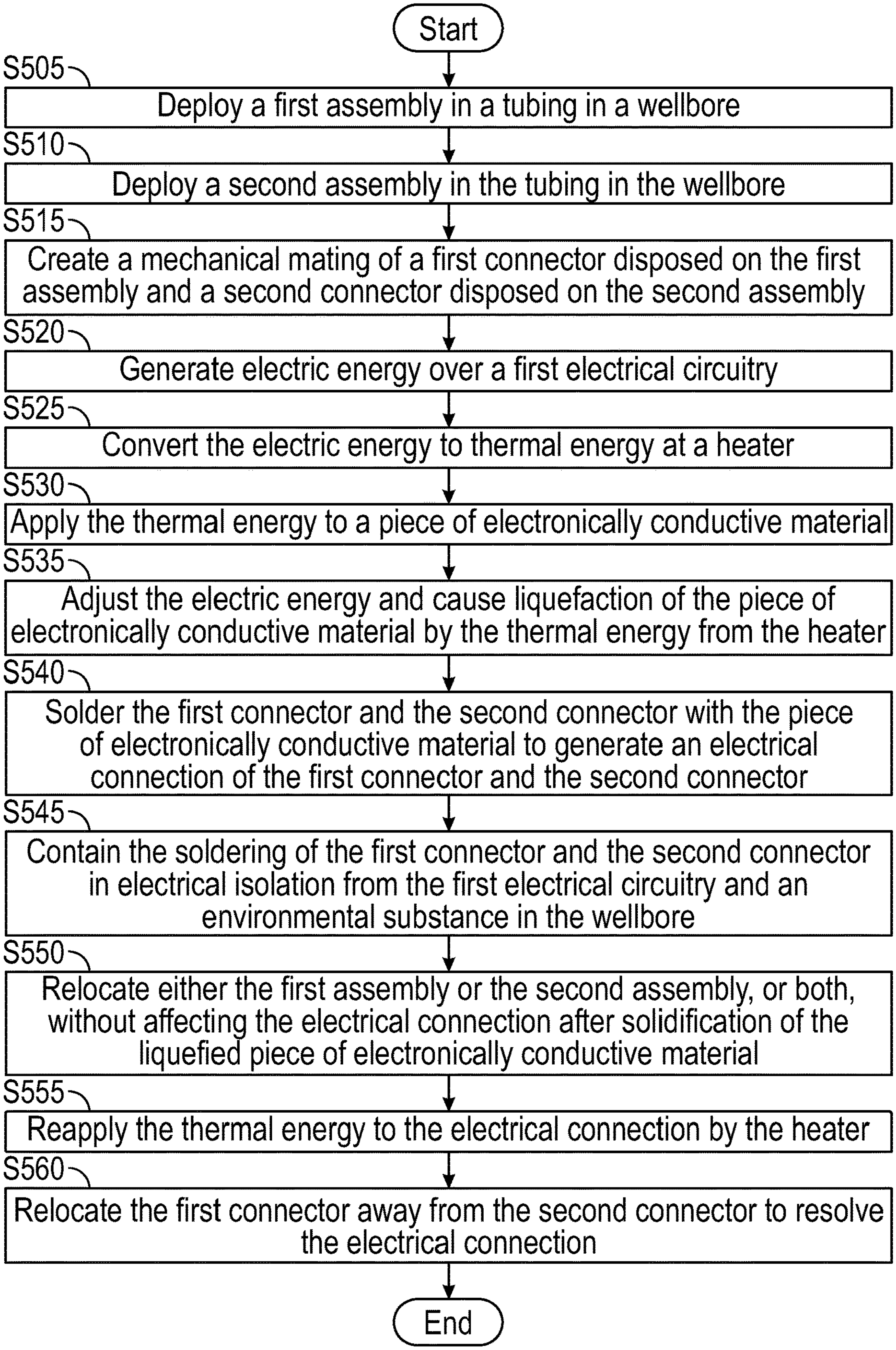
FIG. 5 shows a flowchart showing a method for creating a downhole electrical connection in accordance with one or more embodiments.

FIG. 5 shows a flowchart showing a method for creating a downhole electrical connection in accordance with one or more embodiments.

At S505 in FIG. 5, the system 100 is configured to deploy the first assembly 140 in the tubing 125 in the wellbore 190. The tubing 125 is disposed within the casing 120. The tubing 125 may be a production string in accordance with one or more embodiments.

In some embodiments, the downhole system requiring connection 180 is deployed in the casing 120 inside the wellbore 190. In one configuration, the second connector 155 may be pre-installed in the second assembly 150 connected to the downhole system requiring connection 180. The cable 130 provides a pathway of energy from an electric power supply 110 at the production tree 115 through the tubing 125. However, the cable 130 may contain multiple lines for transmission of various contents, including data signals.

The cable 130 is connected to a first electrical circuitry 210 that supplies electrical energy to a heater 160. The cable 130 thus provides necessary electrical energy that the heater 160 converts to thermal energy. The first electrical circuitry 210 may comprise a conductor, a semiconductor, a switch 166, a resister, etc. In some embodiments, the heater 160 is reversibly connected to two or more conductors and an electrical command to the first electrical circuitry 210 breaks a reversible connection. In other embodiments, the heater 160 is reversibly connected to two or more conductors and an above-limit electrical power through the first electrical circuitry 210 breaks a reversible connection.

At S510, the system 100 is configured to deploy the second assembly 150 in the tubing 125 in the wellbore 190.

At S515, the system 100 is further configured to mechanically mate the first connector 145 disposed in the first assembly 140 and the second connector 155 disposed in the second assembly 150.

Several exemplary implementations of the mechanical mating are discussed above with regards to FIG. 2A. When the apparatus 200 moves the first connector 145 downhole to the proximity of the second connector 155 that is pre-installed in the second assembly 150, a mechanical mating may be formed as shown in FIG. 2A. In some implementations, the movement of the first connector 145 may be controlled by the wiring 135.

When the first connector 145 is positioned in the proximity of (a few millimeters apart, depending on the amount of the electrically conductive material 170 and the configuration of the apparatus 200) the second connector 155, the mechanical mating of the first connector 145 and the second connector 155 is considered to have formed in a broader sense because the connectors may be subsequently bridged over the distance.

Depending upon the forms and electrical features of the first connector 145 and the second connector 155, there may be shorter or wider distances between the first connector 145 and the second connector 155 to realize the electrical connection.

Optionally, the mechanical mating of the first connector 145 and the second connector 155 may be reversed by moving the first assembly 140 or the second assembly 150, or both.

Still at S515 of FIG. 5, the electrically conductive material 170 may be advanced downhole together with the first connector 145 by the wiring 135.

In some embodiments, the electrically conductive material 170 is disposed at a short distance from the heater 160 and the thermal energy emitted from the heater 160 is easily absorbable by the electrically conductive material 170. Alternatively, the bridge or the plate may be incorporated in the apparatus 200 that enhances conveyance of thermal energy from the heater 160 to the electrically conductive material 170.

Continuing with FIG. 5, prior to S520, either the heater is prewired between the connectors so that the wiring allows passage of electrical power to the heater, or some communication is employed to make this connection and allow the application of a potential difference between each connector to pass electrical power to the heater. At S520, the system 100 is configured to generate electric energy to thermal energy at the heater 160. Specifically, the first electrical circuitry 210 is configured to convey electrical energy from the cable 130 and provide the electrical energy to the heater 160. In some examples, the first electrical circuitry 210 may include more than one conductor, one heater 160, and a switch 166.

At S525, the system 100 is configured to convert the electric energy to thermal energy at the heater 160.

At S530, the system 100 is configured to apply the thermal energy to the piece of electronically conductive material 170. By supplying the determined amount of electrical energy from the power supply 110 to the heater 160, then applying the generated thermal energy, the system 100 is able to melt the electrically conductive material 170.

At S535, the system 100 is configured to adjust the electric energy and cause liquefaction of the piece of electronically conductive material 170 by the thermal energy from the heater 160. As previously discussed, the electrical energy necessary to create a certain amount of thermal energy is determinable by the joule heating effect. The system 100 may be configured to generate the determined amount of thermal energy from the heater 160 in accordance with one or more embodiments.

At S540, the system 100 is configured to solder the first connector 145 and the second connector 155 with the piece of electronically conductive material 170 to generate an electrical connection of the first connector 145 and the second connector 155. When the electrically conductive material 170 is heated, the electrically conductive material 170 is able to flow in the direction of gravity, or into a channel if there is any. In some embodiments, the electrically conductive material 170 flows in the direction of gravity and accumulates in the second connector 155. As exemplary implementations of such embodiments, the second connector 155 may be placed below the electrically conductive material 170 to receive the electrically conductive material 170.

At S545, the system 100 is configured to contain the soldering of the first connector 145 and the second connector 155 in isolation from the first electrical circuitry 210 and an environmental substance in the wellbore 190. The apparatus 200 may be configured to dispose a nonconductive material 220 in the space between an outer surface of the electrical connection and the first electrical circuitry 210.

In some embodiments, the system 100 electrically disconnects the heater 160 from the first connector 145 and the second connector 155 after an electrical connection is made between the first connector 145 and the second connector 155. This allows for the connectors' independent use as conductors to electrical circuits via the wiring 135*a*, 135*b*.

At S550, the system 100 is configured to relocate either the first assembly 140 or the second assembly 150, or both, without affecting the electrical connection after solidification of the liquefied piece of electronically conductive material 170. As shown in FIGS. 3A to 3C, after the soldering of first connector 145 and the second connector 155, the apparatus may be able to move the first assembly 140 or the second assembly 150, or both.

At S555, the system 100 is configured to reapply the thermal energy to the electrical connection by the heater 160. For example, the system 100 is configured to convey electrical energy from the cable 130 to generate the electrical energy at the heater 160 to approach the heater 160 toward the electrical connection.

In some embodiments, the system may pass the heater 160 through the nonconductive material 220, using kinetic energy.

In other embodiments, the system 100 may provide electric energy for heating and breaking the nonconductive material 220. For example, energy may be supplied through the first electrical circuitry 210 to enable the heater 160 to generate thermal energy sufficient to create a path in the nonconductive material 220.

The system may supply the determined amount of electrical energy from the power supply 110 to the heater 160 and melt the electrically conductive material 170, in accordance with one or more embodiments.

At S 560, the system 100 is configured to relocate the first connector 145 away from the second connector 155 to resolve or terminate the electrical connection. Once the electrically conductive material 170 liquefies, the electrical connection becomes removable. For example, the first connector 145 may be pulled away from the second connector 155 by a reattached housing. In other implementations, the electrically conductive material 170 is able to be removed from the second connector 155 by a vacuum.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. An apparatus for downhole electrical connection, comprising:

a heater adapted to convert electric energy to thermal energy to liquefy a piece of electronically conductive material;

a first electrical circuitry connected to the heater and a power source;

a first assembly in which a first connector is disposed; and a second assembly in which a second connector is disposed, wherein the apparatus is configured to:

deploy the first assembly and the second assembly in a tubing in a wellbore;

mechanically mate the first connector and the second connector;

control the electric energy provided from the first electrical circuitry to the heater;

electrically connect the first connector and the second connector by soldering the first connector and the second connector with the piece of electronically conductive material; and electrically disconnect the heater from the first electrical circuitry after the soldering.

2. The apparatus of claim 1, wherein the heater is reversibly connected to two or more conductors.

3. The apparatus of claim 1, wherein the apparatus is further adapted to:

resolve the connection between the first electrical circuitry and the heater after the liquefaction of the piece of electronically conductive material.

4. The apparatus of claim 1, wherein the mechanical mating of the first connector and the second connector prevents interruption of generation of the electrical connection by an environmental substance.

5. The apparatus of claim 1, wherein the apparatus is further adapted to:

reverse the mechanical mating of the first connector and the second connector by moving either the first assembly or the second assembly.

6. The apparatus of claim 1, wherein the apparatus is further adapted to:

relocate either the first assembly or the second assembly, or both, without affecting the electrical connection after solidification of the liquefied piece of electronically conductive material.

7. The apparatus of claim 1, wherein the apparatus is further adapted to:

reapply the thermal energy to the electrical connection by the heater; and relocate the first connector away from the second connector to resolve the electrical connection.

8. The apparatus of claim 1, wherein electrically conductive materials are selected from one or more of the following: metals, metal alloys, or native or engineered nonmetallics or composites.

9. The apparatus of claim 1, wherein the first connector and the second connector are a plurality of male connectors and female connectors.

10. The apparatus of claim 1, wherein the first electrical circuitry comprises a conductor.

11. The apparatus of claim 1, wherein the apparatus is further adapted to:

contain the soldering of the first connector and the second connector in isolation from the first electrical circuitry and an environmental substance, including contaminants in the wellbore, wherein a nonconductive material is disposed between an outer surface of the electrical connection and the first electrical circuitry.

12. The apparatus of claim 11, wherein the apparatus is further configured to restore electrical insulation provided by the nonconductive material by repairing a break that was made to the electrical insulation, and wherein supplying above-limit electrical power through the first electrical circuitry or providing an electrical command to the first electrical circuitry disconnects the heater from a reversibly-connected conductor.

13. The apparatus of claim 1, wherein the apparatus is further configured to:

adjust the electric energy and cause liquefaction of the piece of electronically conductive material by the thermal energy from the heater.

14. The apparatus of claim 13, wherein the liquefaction of the piece of electronically conductive material causes the piece of electronically conductive material to separate from the first assembly and flow into the second connector.

15. A method for downhole electrical connection, comprising:

deploying a first assembly in a tubing in a wellbore;

deploying a second assembly in the tubing in the wellbore;

creating a mechanical mating of a first connector disposed on the first assembly and a second connector disposed on the second assembly;

generating electric energy over a first electrical circuitry;

converting the electric energy to thermal energy at a heater;

applying the thermal energy to a piece of electronically conductive material;

soldering the first connector and the second connector with the piece of electronically conductive material to generate an electrical connection of the first connector and the second connector; and electrically disconnecting the heater from the first electrical circuitry after the soldering.

16. The method of claim 15, wherein the heater is reversibly connected to two or more conductors.

17. The method of claim 15, further comprising:

adjusting the electric energy and causing liquification of the piece of electronically conductive material by the thermal energy from the heater, wherein the liquification of the piece of electronically conductive material causes the piece of electronically conductive material to separate from the first assembly and flow into the second connector.

18. The method of claim 15, further comprising:

relocating either the first assembly or the second assembly, or both, without affecting the electrical connection after solidification of the liquefied piece of electronically conductive material;

reapplying the thermal energy to the electrical connection by the heater; and relocating the first connector away from the second connector to resolve the electrical connection.

19. The method of claim 15, further comprising:

containing the soldering of the first connector and the second connector in isolation from the first electrical circuitry and an environmental substance in the wellbore, wherein a nonconductive material is disposed between an outer surface of the electrical connection and the first electrical circuitry.

20. The method of claim 19, further comprising:

restoring electrical insulation provided by the nonconductive material by repairing a break that was made to the electrical insulation, and wherein supplying above-limit electrical power through the first electrical circuitry or providing an electrical command to the first electrical circuitry disconnects the heater from a reversibly-connected conductor.

* * * * *